United States Patent
Dutta et al.

[11] Patent Number: 5,535,045
[45] Date of Patent: Jul. 9, 1996

[54] MODULATION DOPED QUANTUM WELL WAVEGUIDE MODULATOR

[75] Inventors: Mitra Dutta, Matawan; Weimin Zhou, Eatontown, both of N.J.

[73] Assignee: The United States of America as represented by the Secretary of the Army, Washington, D.C.

[21] Appl. No.: 214,730

[22] Filed: Mar. 17, 1994

[51] Int. Cl.$^6$ .................................................. G02F 1/03
[52] U.S. Cl. .......................................... 359/248; 359/245
[58] Field of Search .............................. 257/17, 22, 14, 257/86, 85; 359/245, 248

[56] References Cited

U.S. PATENT DOCUMENTS

| | | | |
|---|---|---|---|
| 5,298,762 | 3/1994 | Ou | 359/248 |
| 5,448,080 | 9/1995 | Han et al. | 359/248 |

OTHER PUBLICATIONS

Zucker et al, "Multi-gigahertz-bandwidth intensity modulators using tunable-electron-density multiple quantum well waveguides", Appl. Phys. Lett 59 (2), American Institute of Physics, pp. 201–203, 8 Jul. 91.

Zucker et al, "Compact Low-Voltage InGaAs/InAlAs Multiple Quantum Well Waveguide Interferometers", Electronics Letters, vol. 26, no. 24, pp. 2029–2031, 22 Nov. 1990.

Primary Examiner—David C. Nelms
Assistant Examiner—F. Niranjan
Attorney, Agent, or Firm—Michael Zelenka; William H. Anderson

[57] ABSTRACT

The dielectric constant and the optical properties of a semiconductor device are changed by tuning the electron density in modulation doped quantum wells. The quantum wells are formed in an "i" region of a p-i-n structure having, in sequence, a 150 Å wide GaAs quantum well, a wider $Al_xGa_{1-x}As$ barrier with a central silicon doped section and an undoped AlGaAs barrier with a slightly higher barrier height to prevent transfer of carriers to the next well. When a reverse bias is applied, more D centers are tuned below the Fermi level so that they can trap electrons from the wells, thereby reducing electron density and changing the optical properties of the material.

17 Claims, 2 Drawing Sheets

MODULATION DOPED QUANTUM WELL WAVEGUIDE MODULATOR

GOVERNMENT INTEREST

The invention described herein may be manufactured, used, and licensed by or for the Government of the United States of America without the payment to us of any royalty thereon.

BACKGROUND OF THE INVENTION

This invention relates to optical waveguides, and more specifically relates to a novel semiconductor heterostructure for optical waveguides.

A large number of applications exist for miniaturized optical waveguide modulators, such as waveguide phase modulators, intensity modulators and interferometers. Specific relevant prior art includes Zucher et al. (infra), wherein the use of a barrier reservoir and quantum well electron transfer structure (BRAQWETS) is known for a Mach Zehnder interferometer, having a phase modulator in one of two split waveguides as described by Zucker et al, "Multi-Gigahertz Bandwidth Intensity Modulators Having Tunable Electron-Density Multiple Quantum Well Waveguides", Phys. Lett., Vol. 59, 201–203 (1990) and Zucker et al. Electron Lett. 26, 2029 (1990).

BRIEF SUMMARY OF THE INVENTION

The present invention provides a novel tunable electron density mechanism to make a controlled change in the optical properties of an optical waveguide. Real tuning of the electron density is employed. More specifically, the novel modulator consists of a semiconductor heterostructure having multiple GaAs/AlGaAs quantum well modulation doped by silicon in one side of the barrier. The quantum wells are sandwiched in a regular waveguide with a p-i-n structure.

However, unlike a BRAQWETS structure, the modulator structure of the invention provides a gradual change of the optical properties, i.e., refractive index, in the waveguide by gradually changing the applied bias. By doing this, the difficulty in material growth of the quaternary InGaAlAs, which is necessary for the BRAQWETS structure, is overcome.

In the preferred embodiment of the invention, there is a 150 Å wide GaAs well atop a wider first $Al_xGa_{1-x}As$ barrier, in which x is equal to or greater than 20%. The AlGaAs barrier has a central silicon doped portion, with a 100 Å undoped spacer on each side. A further undoped AlGaAs barrier is atop the first barrier and has a slightly higher barrier to ordinarily prevent the transfer of carriers to the next well.

By making the fraction x in the first AlGaAs barrier equal to or larger than 22%, a significant number of silicon donors form DX centers when a reverse bias is applied.

Without bias, most silicon donors are ionized, giving electrons to the wells to form the two dimensional electron gas that causes an asymmetric band bending in both well and barrier. The lowest point of DX level is pinned to the Fermi level so that they can trap the electrons from the wells at room temperature, thus reducing the electron density.

When the density of the two dimensional electron gas is changed in the modulation doped wells, the optical properties of the material, such as the absorption edge and the refractive index, changes, thereby changing the phase of light propagating through the material. Thus, tuning the electron density causes a phase change in the waveguide structure.

Since this waveguide modulator may provide a controllable gradual phase shift for the guided light, the present invention has a wide application to miniaturized optical devices such as a Mach Zehnder rib waveguide interferometer or the like, and permits the integration of a microspectrometer into small semiconductor chips. Such devices will have miniature size and low cost and can be used in such applications as target recognition (by color), chemical analysis, remote sensing of any type, spectroscopy in general and in robotics applications.

DETAILED DESCRIPTION OF THE DRAWINGS

Figure 1:
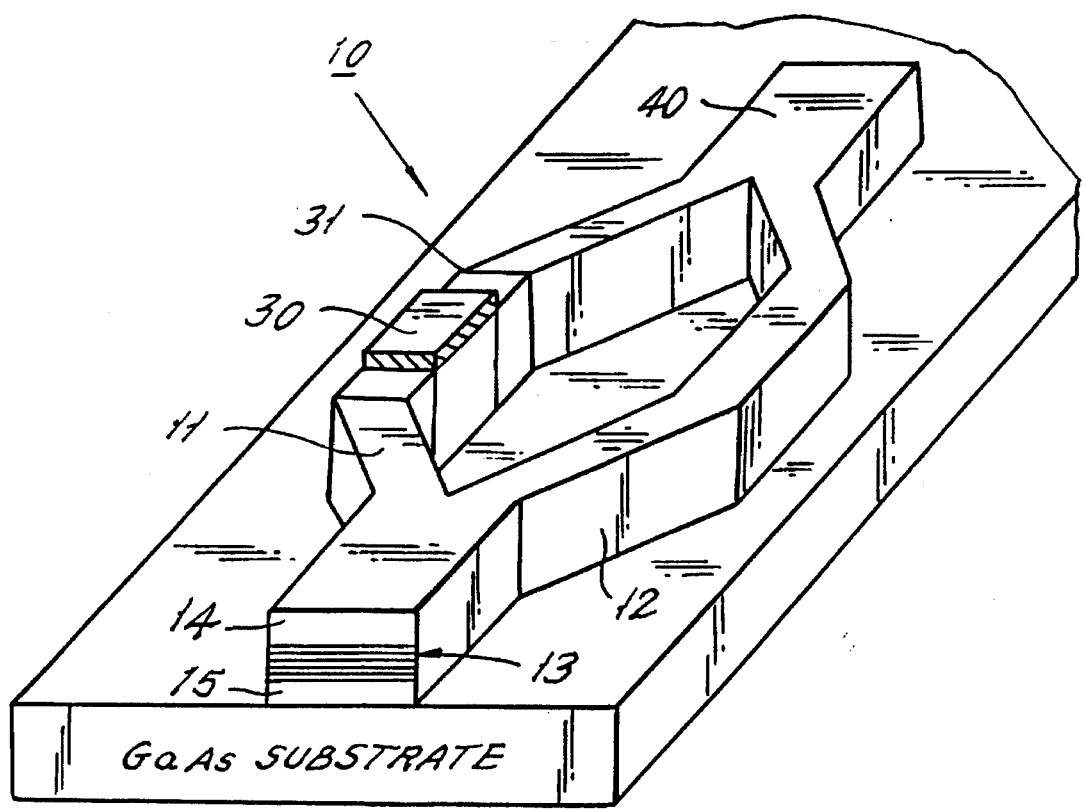
FIG. 1 is a perspective diagram of a preferred embodiment of the invention, in which the multiple one-sided doped GaAs/AlGaAs asymmetric quantum well structure is used as the waveguiding layer built into a Mach Zehnder rib waveguide interferometer.

Referring first to FIG. 1, there is shown a first embodiment of the invention as a Mach Zehnder rib waveguide interferometer 10 having two legs 11 and 12. The semiconductor heterostructure for the modulator 13 is a multiple GaAs/AlGaAs quantum well modulation doped by silicon in one side of the barrier. The quantum wells are sandwiched in a regular waveguide with a p-i-n structure. Thus, in FIG. 1, there is a top P-type AlGaAs cladding layer 14 and a low N-type AlGaAs cladding layer 15.

Figure 2:
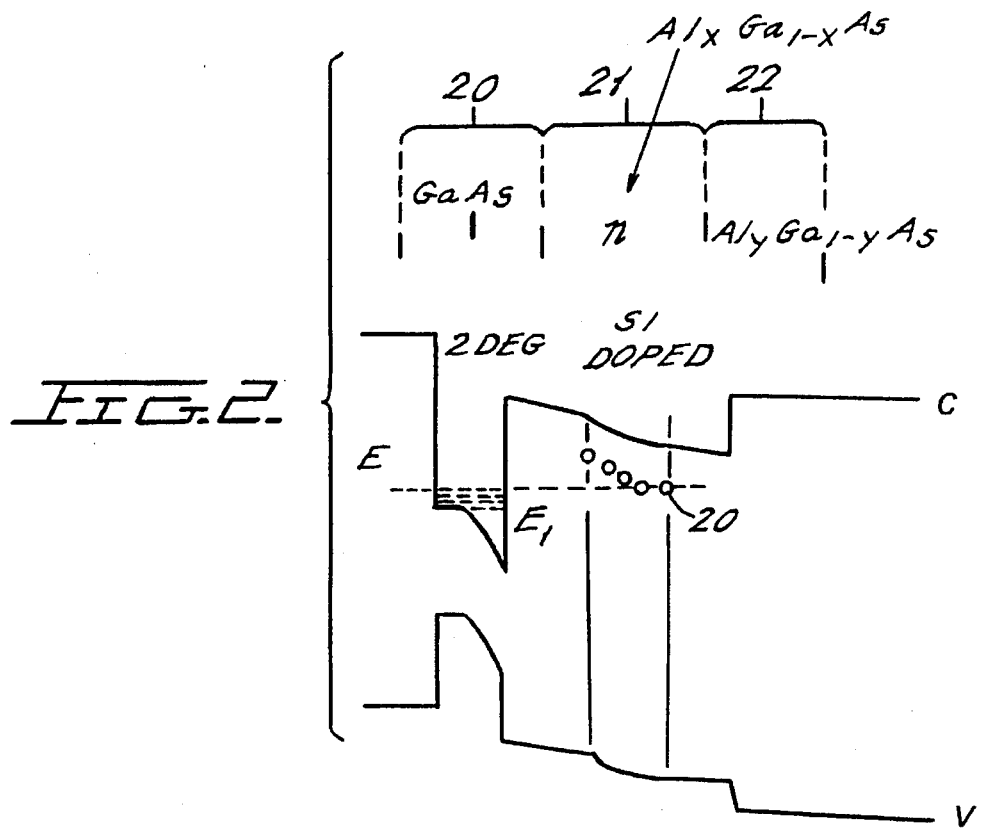
FIG. 2 is a diagram showing the energy level of the modulation doped quantum well of FIG. 1 without bias.

The multiple one-sided modulation doped quantum wells of FIG. 1 have the structure best understood from FIG. 2 and consists of an approximately 150 Å wide GaAs quantum well 20, a wide $Al_xGa_{1-x}As$ barrier atop the GaAs layer 21 and a second, but undoped, barrier $Al_yGa_{1-y}As$ layer 22, atop layer 22. If the Al fraction x is equal to or larger than 22%, significant silicon donors form DX centers. The percentage y in the $Al_xGa_{1-y}As$ is greater than x by about 5%. The silicon doping is greater or equal to about $10^{18}cm^{-3}$. The quantum wells are repeated five to ten times.

The second barrier 21 has a slightly higher barrier height to prevent the transfer of carriers to the next well in the stack.

When no bias is applied, as in FIG. 2, most silicon donors are ionized, giving an electron to the wells to form the two-dimensional electron gas which causes an asymmetric band bending in both well and barrier. The lowest point of the DX level 20 shown in FIG. 2 is pinned at the Fermi level as shown.

Figure 3:
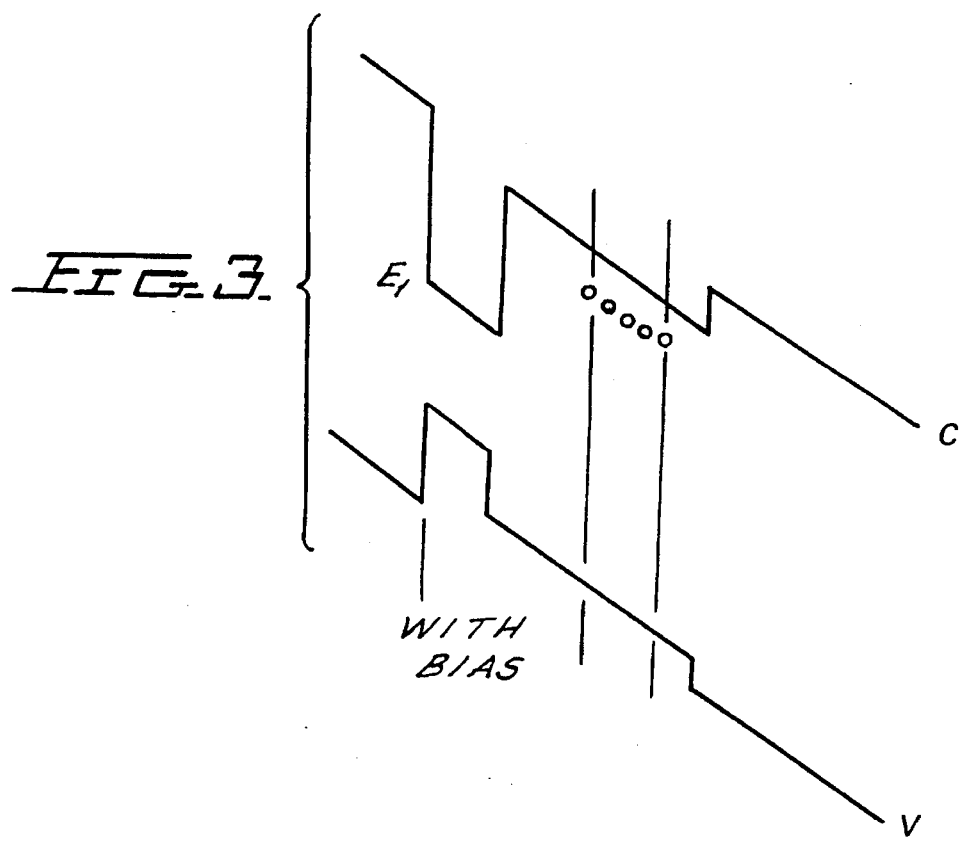
FIG. 3 shows the diagram of FIG. 2 with bias applied, to modulate the optical characteristics of the device of FIG. 1.

When the reverse bias is applied, more DX centers are tuned below the Fermi level so they can trap more electrons from the wells at room temperature, as shown in FIG. 3, thereby reducing the electron density.

When the density of the two dimensional electron gas is changed in the modulation doped wells, the absorption edge changes which, in turn, changes the dielectric constant of the material and changes the phase of light propagating in the material. Therefore, tuning the electron density makes the phase change in the waveguide structure of FIG. 1.

The manufacture of the device of FIG. 1 can obviously employ conventional lithographic definition and etching techniques. An active phase modulation section 30 is formed on the central portion of rib 11 by a metal contact layer and an electrical isolation of the P-type cladding 31, and using H-ion implantation to electrically isolate the active phase modulation section from the rest of the waveguide.

By applying a voltage, the phase of the light may be modulated due to a change in properties of the material, i.e., the refractive index and absorption edge.

In operation, incident light is split between legs or ribs 11 and 12, and the light in leg 11 is phase shifted by the modulator relative to that in leg 12. Interference is then produced at the joining output 40 in a variably controlled manner.

In a preferred embodiment of the invention, an electron transfer quantum well waveguide phase modulator consists of an n type substrate which carries a bottom cladding layer of $Al_{0.44}GaAs$ which may have a thickness of 1 to 1.5 micrometers and a concentration of $1-5\times10^{18}/cm^{-3}$.

The core guiding layer is formed atop the guiding layer and consists, from bottom up, of the following basic structure which is repeated five to ten times:

$Al_yGa_{1-y}As$ (undoped) (500 Å);

$Al_yGa_{1-x}As$ (undoped) (50 Å);

$Al_yGa_{1-x}As$ n ($1-5\times10^{18}/cm^{-3}$) (200–600 Å)

$Al_xGa_{1-x}$ As (undoped) (100–200 Å)

GaAs (undoped) (100–150 Å)

In the above, $x \geq 22\%$; $y \geq x+5\%$

The top cladding layer consists of three layers which are, from the bottom up:

$Al_{0.44}Ga_{0.66}As$ ($P^+$)($Be\sim5\times10^{18}$) $cm^{-3}$ (1–1.5 µm)

$Al_{0.44}Ga_{0.66}As$ ($P^+$)($Be\sim5\times10^{18}$) $cm^{-3}$(~1000 Å)

$GaAs(P^+)$ ($Be\sim5\times10^{18}cm^{-3}$) (~500 Å)

As those skilled in the art will appreciate from this, the device so formed in FIG. 1 can then be used in applications of a Mach Zehnder interferometer, or in waveguide light intensity modulators, multiple wavelength microspectrometers and the like.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A modulation doped quantum well waveguide modulator comprising, in combination:

a) a first thin planar GaAs quantum well layer;

b) a second thin $Al_xGa_{1-x}As$ barrier layer disposed atop said GaAs quantum well layer;

c) a third thin AlGaAs barrier layer disposed atop said $Al_xGa_{1-x}As$ barrier layer, wherein x is equal to or greater than 20%;

d) a silicon doped N region disposed in the center of said $Al_xGa_{1-x}As$ barrier layer.

2. The device of claim 1 wherein said layers of GaAs, $Al_xGa_{1-x}As$ and AlGaAs are coextensive with one another.

3. The device of claim 1 wherein said GaAs quantum well layer has a thickness of about 150 Å; said $Al_xGa_{1-x}As$ barrier layer has 100 Å regions on either side of said silicon doped N region.

4. The device of claim 2 wherein said GaAs quantum well layer has a thickness of about 150 Å; said $Al_xGa_{1-x}As$ barrier layer has 100 Å regions on either side of said silicon doped N region.

5. The device of claim 1 wherein said AlGaAs layer has a higher barrier than that of said $Al_xGa_{1-x}As$ layer.

6. The device of claim 3 wherein said AlGaAs layer has a higher barrier than that of said $Al_xGa_{1-x}As$ layer.

7. The device of claim 6 wherein said layers of GaAs, $Al_xGa_{1-x}As$ and AlGaAs are coextensive with one another.

8. The device of claim 1 which contains a plurality of sets of said first, second and third layers.

9. The device of claim 8 wherein said layers of GaAs, $Al_xGa_{1-x}As$ and AlGaAs are coextensive with one another.

10. The device of claim 9 wherein said GaAs quantum well layer has a thickness of about 150 Å; said $Al_xGa_{1-x}As$ barrier layer has 100 Å regions on either side of said silicon doped N region.

11. The device of claim 9 wherein said AlGaAs layer has a higher barrier than that of said $Al_xGa_{1-x}As$ layer.

12. The device of claim 8 which further has a layer of P type cladding on top of the free surface of said AlGaAs layer, and a layer of N type cladding on the bottom of said layer of said third AlGaAs.

13. The device of claim 2 which further has a layer of P type cladding on top of the free surface of said AlGaAs layer, and a layer of N type cladding on the bottom of said layer of said third AlGaAs.

14. The device of claim 3 which further has a layer of P type cladding on top of the free surface of said AlGaAs layer, and a layer of N type cladding on the bottom of said layer of said third AlGaAs.

15. The device of claim 5 which further has a layer of P type cladding on top of the free surface of said AlGaAs layer, and a layer of N type cladding on the bottom of said layer of said third AlGaAs.

16. An electron-transfer modulation doped, quantum well, waveguide phase modulator comprising:

an active modulation doped multiple quantum well waveguiding core formed of alternating layers of AlGaAs and GaAs;

a p-type doped AlGaAs cladding region disposed on one side of said waveguiding core;

an n-type doped AlGaAs cladding region disposed on the other side of said waveguiding core; and an n-type GaAs substrate disposed adjacent said n-type doped cladding region, wherein the waveguiding core includes a plurality of layers which each contain:

(a) a planar GaAs undoped quantum well layer between 100 Å and 200 Å in width;

(b) a first undoped $Al_xGa_{1-x}As$ barrier between 100 Å and 200 Å, wherein x is greater than 20% and wherein said first undope barrier serves as a spacer layer which is disposed below said quantum well layer;

(c) an n-type Si-doped $Al_xGa_{1-x}As$ barrier between 200 Å and 400 Å in width, wherein said Si-doped barrier is disposed under said first undoped barrier and is doped to approximately $1-5\times10^{18}cm^{-3}$;

(d) a second undoped $Al_xGa_{1-x}As$ barrier approximately 50 Å in width, said second undoped barrier being disposed below the Si-doped barrier;

(e) a second doped $Al_yGa_{1-y}As$ wherein $y \geq x+5\%$ and wherein said second undoped barrier is disposed below the second undoped barrier and is approximately 500 Å; and (f) an interim undoped $Al_yGa_{1-y}As$ barrier which is approximately 500 Å; wherein said interim layer is disposed between said p-type cladding region and the waveguiding core.

17. An electron-transfer modulation doped, quantum well, waveguide phase modulator comprising:
   an active modulation doped multiple quantum well waveguiding core formed of alternating layers of AlGaAs and GaAs;
   a p-type doped AlGaAs cladding region disposed on one side of said waveguiding core;
   an n-type doped AlGaAs cladding region disposed on the other side of said waveguiding core; and
   an n-type GaAs substrate disposed adjacent said n-type doped cladding region,
   wherein the p-type cladding region includes a 1 to 1.5 micrometer AlGaAs p-type beryllium doped layer wherein a AlAs fraction is larger than y, a second $p^+$-type doped AlGaAs layer which is 1000 Å in width, and thin $p^+$-GaAs layer which serves as a cap layer.

* * * * *